United States Patent
Eickhoff et al.

(10) Patent No.: US 11,594,088 B2
(45) Date of Patent: Feb. 28, 2023

(54) ACCESS CONTROL FOR EMERGENCY RESPONDERS

(71) Applicant: Schlage Lock Company LLC, Carmel, IN (US)

(72) Inventors: Brian C. Eickhoff, Danville, IN (US); Daniel Hughes, Fishers, IN (US); Mark Nichols, Noblesville, IN (US); Brady Plummer, Fishers, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 16/986,318

(22) Filed: Aug. 6, 2020

(65) Prior Publication Data

US 2022/0044505 A1    Feb. 10, 2022

(51) Int. Cl.
*G07C 9/00* (2020.01)
*H04W 4/80* (2018.01)

(52) U.S. Cl.
CPC .......... *G07C 9/00571* (2013.01); *H04W 4/80* (2018.02); *G07C 2009/00769* (2013.01)

(58) Field of Classification Search
CPC ..... G07C 9/00571; G07C 2009/00769; H04W 4/80
See application file for complete search history.

(56) References Cited

U.S. PATENT DOCUMENTS

| | | | |
|---|---|---|---|
| 8,884,783 B2 | 11/2014 | Roberts et al. | |
| 10,062,233 B1* | 8/2018 | Rogers | G07C 9/00896 |
| 2003/0231103 A1* | 12/2003 | Fisher | G07C 9/00896 |
| | | | 340/5.73 |
| 2008/0122609 A1* | 5/2008 | Mannisto | G08B 25/016 |
| | | | 340/500 |
| 2014/0049364 A1* | 2/2014 | Ahearn | G07C 9/00174 |
| | | | 340/5.51 |
| 2014/0232518 A1* | 8/2014 | Stoehr | G07B 15/04 |
| | | | 340/5.6 |
| 2017/0249831 A1* | 8/2017 | Wengrovitz | H04W 76/12 |
| 2019/0114692 A1* | 4/2019 | Briggs | G06Q 10/0875 |
| 2019/0289466 A1* | 9/2019 | Conant | H04W 12/06 |

* cited by examiner

*Primary Examiner* — Omer S Khan
(74) *Attorney, Agent, or Firm* — Taft Stettinius & Hollister LLP (57) ABSTRACT

A method of access control for emergency responders according to one embodiment includes transmitting, by an access control server, an access credential to an emergency responder server over a first network, transmitting, by the emergency responder server, the access credential to an emergency responder mobile device over a second network different from the first network, wherein the second network includes a dedicated emergency responder network, and transmitting the access credential by the emergency responder mobile device to an access control device.

13 Claims, 5 Drawing Sheets

ACCESS CONTROL FOR EMERGENCY RESPONDERS

BACKGROUND

Emergency responders such as firemen, police officers, and emergency medical services respond to incidents every day in which they must gain access to a building to manage an emergency situation. In doing so, emergency personnel routinely encounter common problems. For example, emergency responders may arrive with nobody available to grant access to the building. Additionally, time may be lost searching for a Knox Box, time may be lost using mechanical keys to access a Knox Box and/or main entrance, and/or time may be lost navigating through the building to reach an area under duress (i.e., rather than gaining access through the door nearest the emergency situation).

SUMMARY

One embodiment is directed to a unique system, components, and methods for providing access control to emergency responders. Other embodiments are directed to apparatuses, systems, devices, hardware, methods, and combinations thereof for providing access control to emergency responders.

According to an embodiment, a method of access control for emergency responders may include transmitting, by an access control server, an access credential to an emergency responder server over a first network, transmitting, by the emergency responder server, the access credential to an emergency responder mobile device over a second network different from the first network, wherein the second network includes a dedicated emergency responder network, and transmitting the access credential by the emergency responder mobile device to an access control device.

In some embodiments, transmitting the access credential by the access control server to the emergency responder server may include transmitting the access credential via a cloud-to-cloud interface.

In some embodiments, the method may further include receiving, by the emergency responder server, a notification of emergency dispatch, and transmitting, by the emergency responder server, a request for the access credential to the access control server in response to receiving the notification of the emergency dispatch, wherein transmitting the access credential to the emergency responder server comprises transmitting the access credential to the emergency responder server in response to receiving the request from the emergency responder server.

In some embodiments, the notification of the emergency dispatch may include at least one identifier of the access control device.

In some embodiments, the method may further include authenticating, by the access control device, the access credential received from the emergency responder mobile device, and granting, by the access control device, a user of the emergency responder mobile device access to a passageway secured by the access control device in response to successful authentication of the access credential.

In some embodiments, the method may further include transmitting, by the emergency responder server, the access credential to a plurality of emergency responder mobile devices including the emergency responder mobile device.

In some embodiments, transmitting the access credential by the emergency responder mobile device to the access control device may include transmitting the access credential to the access control device over a wireless communication connection between the emergency responder mobile device and the access control device.

In some embodiments, the wireless communication connection may be a Bluetooth communication connection.

In some embodiments, the wireless communication connection may be an NFC communication connection.

In some embodiments, the wireless communication connection may be an Ultra-Wide Band communication connection.

According to another embodiment, a system may include an access control system comprising a first processor and a first memory comprising a first plurality of instructions, an emergency responder server comprising a second processor and a second memory comprising a second plurality of instructions, and an emergency responder mobile device comprising a third processor and a third memory comprising a third plurality of instructions, wherein the first plurality of instructions causes the access control system to transmit an access credential to the emergency responder server over a first network, wherein the second plurality of instructions causes the emergency responder server to transmit the access credential to the emergency responder mobile device over a second network different from the first network, wherein the second network includes a dedicated emergency responder network, and wherein the third plurality of instructions causes the emergency responder mobile device to transmit the access credential to the access control system.

In some embodiments, to transmit the access credential by the access control server to the emergency responder server may include to transmit the access credential via a cloud-to-cloud interface.

In some embodiments, the second plurality of instructions may further cause the emergency responder server to receive a notification of emergency dispatch, and transmit a request for the access credential to the access control server in response to receipt of the notification of the emergency dispatch, wherein to transmit the access credential to the emergency responder server comprises to transmit the access credential to the emergency responder server in response to receipt of the request from the emergency responder server.

In some embodiments, the notification of the emergency dispatch may include at least one identifier of the access control system.

In some embodiments, the first plurality of instructions may cause the access control system to authenticate the access credential received from the emergency responder mobile device, and grant a user of the emergency responder mobile device access to a passageway secured by the access control system in response to successful authentication of the access credential.

In some embodiments, the second plurality of instructions may further cause the emergency responder server to transmit the access credential to a plurality of emergency responder mobile devices including the emergency responder mobile device.

In some embodiments, to transmit the access credential by the emergency responder mobile device to the access control system may include to transmit the access credential to the access control system over a wireless communication connection between the emergency responder mobile device and the access control system.

In some embodiments, the wireless communication connection may be a Bluetooth communication connection.

In some embodiments, the wireless communication connection may be an NFC communication connection.

In some embodiments, the wireless communication connection may be an Ultra-Wide Band communication connection.

According to yet another embodiment, a method of access control for emergency responders may include receiving, by an emergency responder server, a notification of emergency dispatch, transmitting, by the emergency responder server, an access command to an access control system over a dedicated emergency responder network, and granting, by the access control system, access to a passageway secured by the access control system in response to determining that an emergency responder vehicle is within a geofence of the access control system.

In some embodiments, the method may further include monitoring a location of the emergency responder vehicle.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

Figure 1:
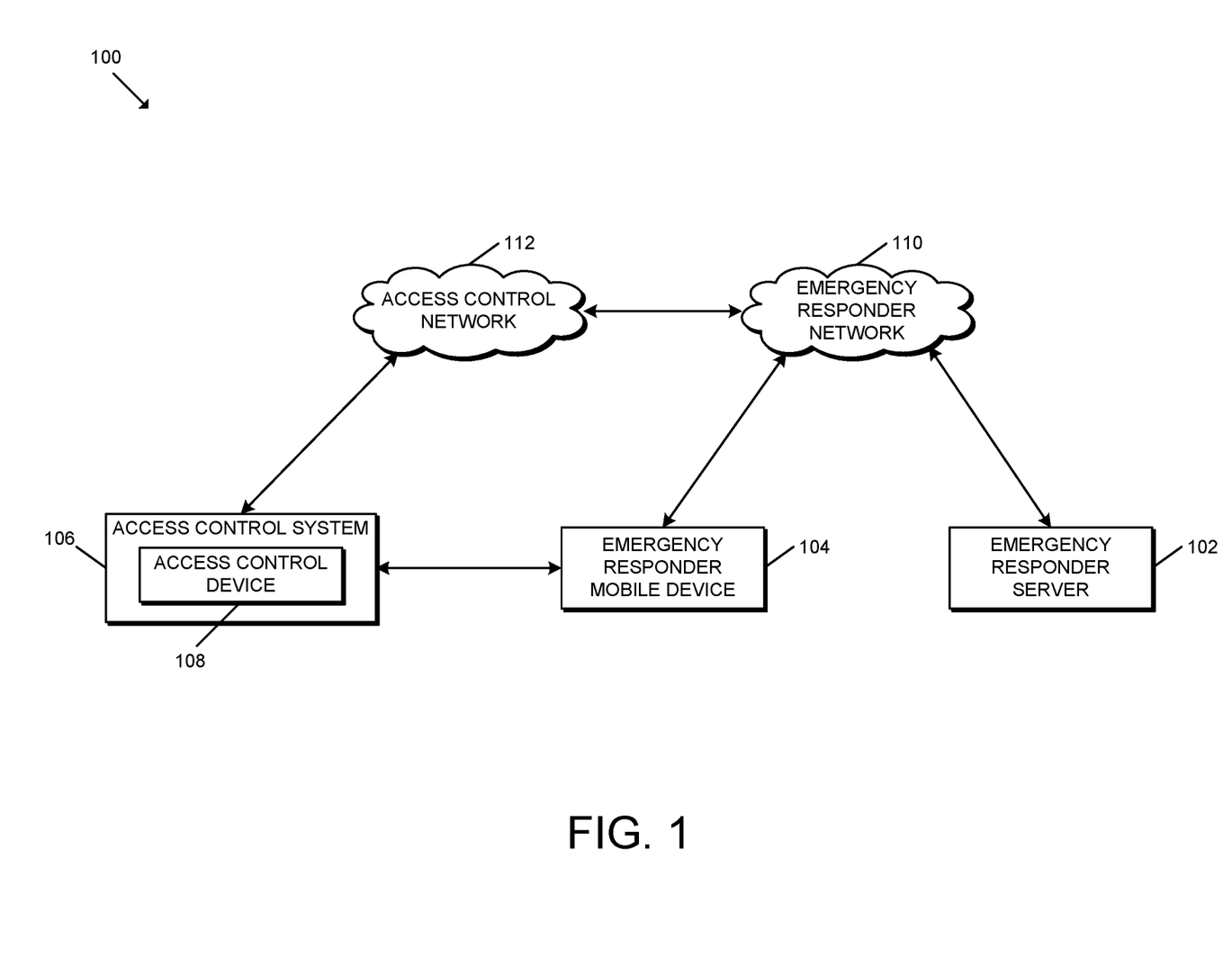
FIG. 1 is a simplified block diagram of at least one embodiment of a system for providing access control to emergency responders.

Referring now to FIG. 1, in the illustrative embodiment, a system 100 for providing access control to emergency responders is shown. The illustrative system 100 includes an emergency responder server 102, an emergency responder mobile device 104, an access control system 106, an access control device 108, an emergency responder network 110, and an access control network 112. As described in greater detail below, the system 100 allows for the secure transmission of access credentials to emergency responders to ensure that the emergency responders can efficiently gain access to an emergency situation within a building without unnecessary loss of time. Although the dispatch and computing devices are generally described herein in reference to an "emergency," it should be appreciated that the techniques described herein may apply to granting authorized legal, medical, and/or other personnel access to buildings in other embodiments.

It should be appreciated that the emergency responder server 102, the emergency responder mobile device 104, the access control system 106, and/or the access control device 108 may be embodied as any type of device or collection of devices suitable for performing the functions described herein. More specifically, in the illustrative embodiment, the emergency responder server 102 may be embodied as any type of device capable of receiving notifications of emergency dispatch (e.g., associated with a 911 call or other emergency call) to a particular location, communicating with the access control system 106 (e.g., via communication networks) to obtain appropriate access credentials for access to the relevant building, and transmitting the access credential to the relevant emergency responder mobile device(s) 104 possessed by the emergency personnel responding to the situation for access thereto. In some embodiments, the emergency response server 102 may be embodied as, updated by, and/or otherwise communicatively coupled to an emergency dispatch system/operation.

The emergency responder mobile device 104 may be embodied as any type of mobile device that allows the emergency responder to securely communicate with the emergency responder server 102 and provide access credentials to the access control system 106 and/or access control device 108. As shown in FIG. 1, in the illustrative embodiment, the emergency responder mobile device 104 is configured to communicate with the emergency responder server 102 via the emergency responder network 110, which may be embodied as a dedicated emergency response network for secure communication between emergency responder devices (e.g., FirstNet). In some embodiments, the emergency responder mobile device 104 may include an application that enables the mobile device 104 to communicate via the emergency responder network 110. In such embodiments, it should be appreciated that the application may be embodied as any suitable type of application for performing the functions described herein.

The access control system 106 may be configured to manage access credentials that may be used to gain access through passageways secured by access control devices 108. For example, the access control system 106 may be responsible for ensuring that the access control devices 108 have updated authorized credentials, whitelists, blacklists, device parameters, and/or other suitable data. Additionally, in some embodiments, the access control system 106 may receive security data, audit data, raw sensor data, and/or other suitable data from the access control devices 108 for management of the access control system 106. In some embodiments, one or more of the devices of the access control system 106 may be embodied as an online server or a cloud-based server. As such, the access control system 106 may be referred to simply as an access control server for simplicity. Further, in some embodiments, the access control system 106 may communicate with multiple access control devices 108 at a single site (e.g., a particular building) and/or across multiple sites. That is, in such embodiments, the access control system 106 may be configured to receive data from access control devices 108 distributed across a single building, multiple buildings on a single campus, or across multiple locations.

In the illustrative embodiment, the access control device 108 may be embodied as any type of device capable of controlling access through a passageway. For example, in some embodiments, the access control device 108 may be embodied as an electronic lock (e.g., a mortise lock, a cylindrical lock, or a tubular lock), gate opener, exit device, auto-operator, garage door opener, or a peripheral controller of a passageway. Depending on the particular embodiment, the access control device 108 may include a credential reader or be electrically/communicatively coupled to a credential reader configured to communicate with the mobile device 104 to receive access credentials. For simplicity and brevity of the description, it should be appreciated that the access control system 106 and the access control device 108 may be described herein as a single device. In other embodiments, it should be appreciated that the access control device 108 is merely a Knox Box, which may be opened using the access credential, and a mechanical key within may be subsequently used for access into the building.

In the illustrative embodiment, the access credential may be embodied as or include wireless access credentials (e.g., Bluetooth access credentials, NFC access credentials, Ultra-Wide Band (UWB) credentials, etc.), which allow the mobile device 104 to be communicate the access credential to the access control device 108 via wireless communication. However, it should be appreciated that the access credentials may, additionally or alternatively, include other types of access credentials in other embodiments (e.g., proximity cards, smartcards, etc.).

Each of the emergency responder network 110 and the access control network 112 may be embodied as any type of communication network capable of facilitating communication between the various devices of the system 100 and otherwise performing the functions described herein. As such, the network 110, 112 may include one or more networks, routers, switches, computers, and/or other intervening devices. For example, the network 110, 112 may be embodied as or otherwise include one or more cellular networks, telephone networks, local or wide area networks, publicly available global networks (e.g., the Internet), ad hoc networks, short-range communication links, or a combination thereof.

In the illustrative embodiment, the emergency responder network 110 is embodied as a network dedicated to and secured for communication between emergency and first responders (e.g., FirstNet). The access control network 112 may be embodied as any type of network (public or private) that allows the access control system 106 to communicate with the emergency responder devices 102, 104. For example, in some embodiments, the access control network 112 may leverage an API that allows for a network-tonetwork or cloud-to-cloud communication interface between the emergency responder network 110 and the access control network 112.

It should be further appreciated that, although the server 102 is described herein as a computing device outside of a cloud computing environment, in other embodiments, the server 102 may be embodied as a cloud-based device or collection of devices within a cloud computing environment. Further, in cloud-based embodiments, the server 102 may be embodied as a server-ambiguous computing solution, for example, that executes a plurality of instructions on-demand, contains logic to execute instructions only when prompted by a particular activity/trigger, and does not consume computing resources when not in use. That is, the server 102 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the server 102 described herein. For example, when an event occurs (e.g., data is transferred to the server 102 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of access control data is made (e.g., via an appropriate user interface to the server 102 the appropriate virtual function(s) may be executed to perform the actions before eliminating the instance of the virtual function(s). Similarly, other devices described herein as servers may similarly be embodied as one or more cloud-based devices in some embodiments.

It should be appreciated that each of the emergency responder server 102, the emergency responder mobile device 104, the access control system 106, and/or the access control device 108 may be embodied as a computing device/system similar to the computing system 300 described below in reference to FIG. 3. For example, in the illustrative embodiment, one or more of the emergency responder mobile device 104, the access control system 106, and/or the access control device 108 may include a processing device 302 and a memory 306 having stored thereon operating logic 308 for execution by the processing device 302 for operation of the corresponding device.

Figure 2:
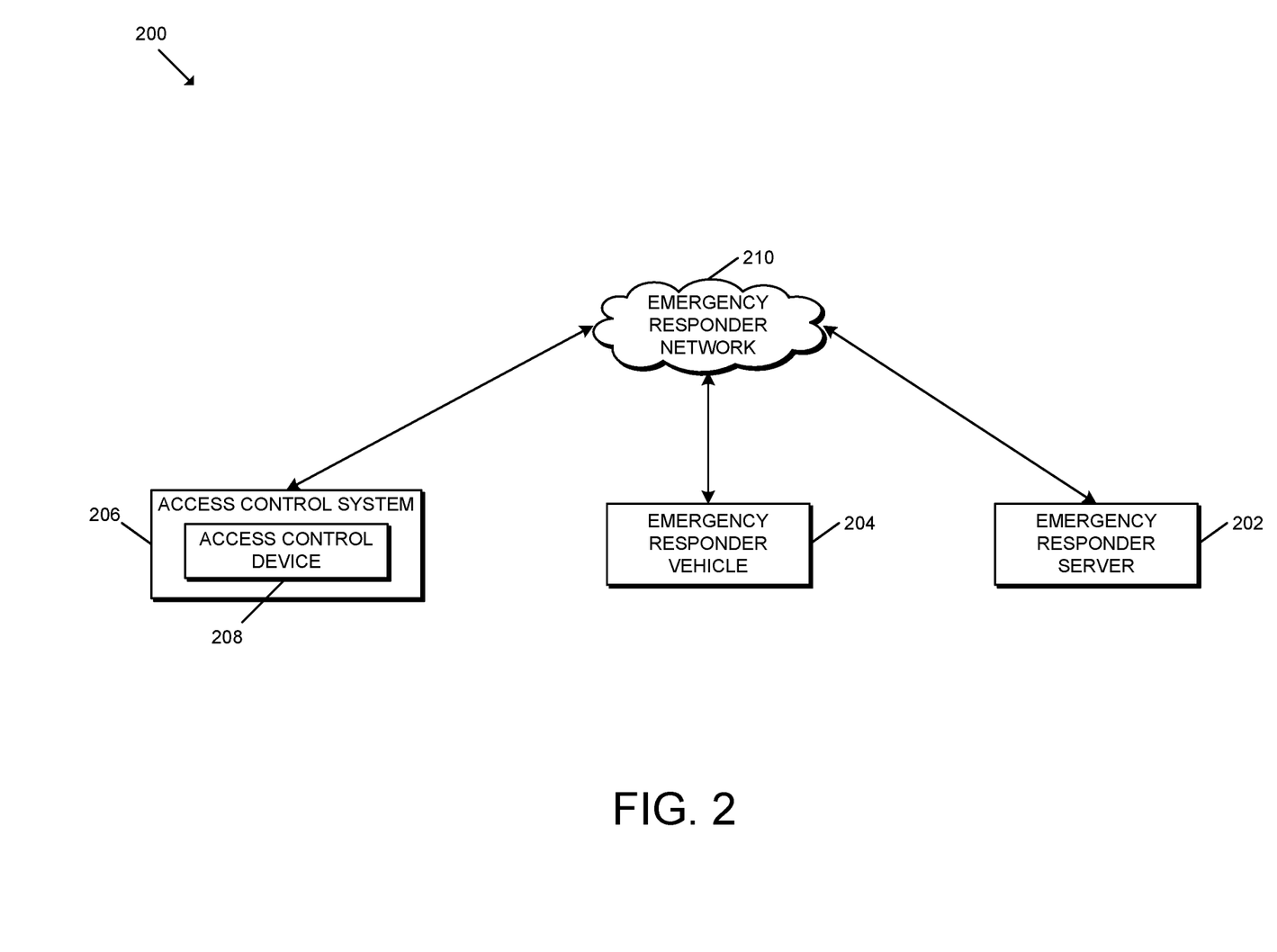
FIG. 2 is another simplified block diagram of at least one embodiment of a system for providing access control to emergency responders.

Referring now to FIG. 2, in the illustrative embodiment, a system 200 for providing access control to emergency responders is shown. The illustrative system 200 includes an emergency responder server 202, an emergency responder vehicle 204, an access control system 206, an access control device 208, and an emergency responder network 210. As described in greater detail below, the system 200 allows for existing emergency response infrastructure for priority control systems and traffic management to be integrated with building access control systems to allow emergency responder vehicles 204 to function as a type of physical credential devices.

It should be appreciated that the emergency responder server 202, the emergency responder vehicle 204, the access control system 106, and/or the access control device 108 may be embodied as any type of device or collection of devices suitable for performing the functions described herein. More specifically, in the illustrative embodiment, the emergency responder server 102 may receive a notification of emergency dispatch (e.g., associated with a 911 call or other emergency call) to a particular location and transmit an access command to the access control system 106 (or access control device 108 in particular) via the emergency responder network 210 to allow the access control device 108 to grant access to the responder when the emergency responder vehicle 204 enters a geofence associated with the access grant. Although the emergency responder vehicle 204 is described herein as a vehicle (e.g., ambulance, police car, etc.), it should be appreciated that the emergency responder vehicle 204 may be embodied as an emergency responder mobile device in other embodiments.

It should be further appreciated that the emergency responder server 202, the access control system 206, the access control device 208, and the emergency responder network 210 of FIG. 2 may be similar to the emergency responder server 102, the access control system 106, the access control device 108, and the emergency responder network 110 of FIG. 1, respectively. Accordingly, the descriptions of the emergency responder server 102, the access control system 106, the access control device 108, and the emergency responder network 110 are equally applicable to the emergency responder server 202, the access control system 206, the access control device 208, and the emergency responder network 210, and the descriptions of those devices, systems, and networks have not been repeated for brevity of the disclosure.

It should be appreciated that each of the emergency responder server 102, the emergency responder mobile device 104, the access control system 106, the access control device 108, the emergency responder server 202, the emergency responder vehicle 204, the access control system 206, and/or the access control device 208 may be embodied as a computing device/system similar to the computing system 300 described below in reference to FIG. 3. For example, in the illustrative embodiment, one or more of the emergency responder server 102, the emergency responder mobile device 104, the access control system 106, the access control device 108, the emergency responder server 202, the emergency responder vehicle 204, the access control system 206, and/or the access control device 208 may include a processing device 302 and a memory 306 having stored thereon operating logic 308 for execution by the processing device 302 for operation of the corresponding device.

Figure 3:
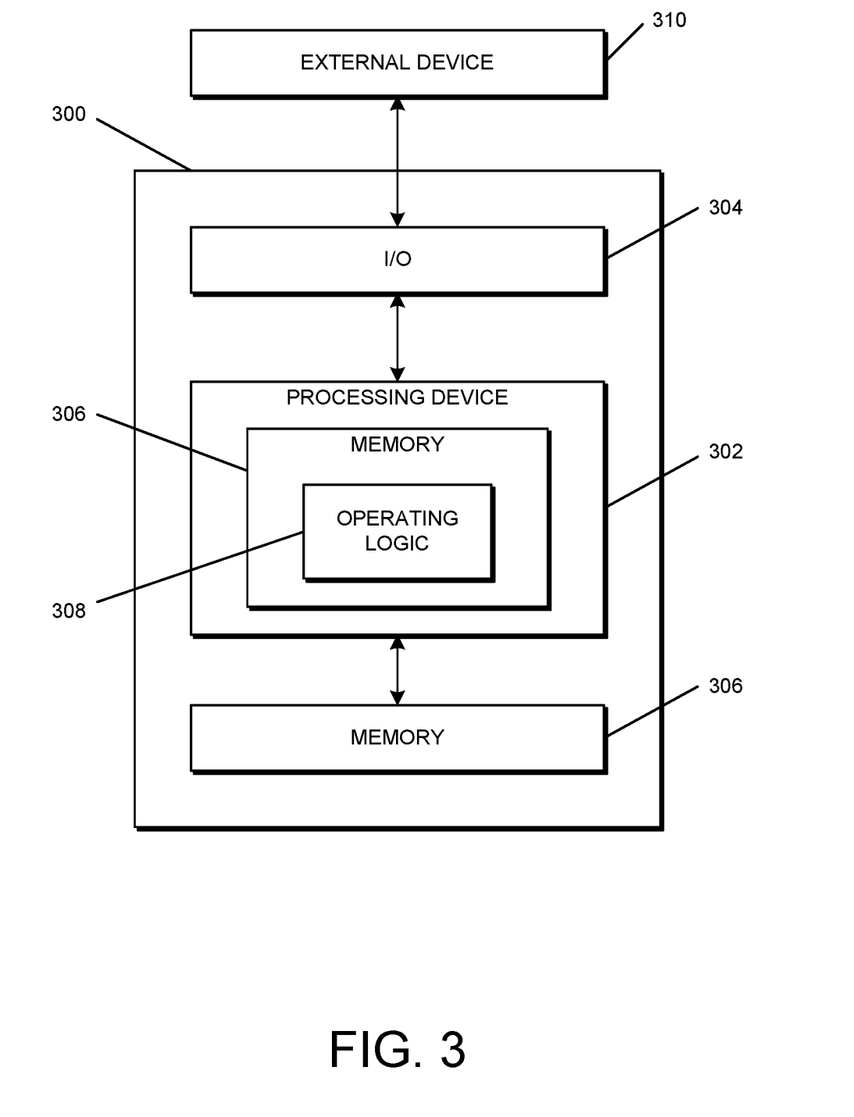
FIG. 3 is a simplified block diagram of at least one embodiment of a computing system.

Referring now to FIG. 3, a simplified block diagram of at least one embodiment of a computing system 300 is shown. The illustrative computing system 300 depicts at least one embodiment of a computing device/system that may be utilized in connection with the emergency responder server 102, the emergency responder mobile device 104, the access control system 106, the access control device 108, the emergency responder 202, the emergency responder vehicle 204, the access control system 206, and/or the access control system 208 illustrated in FIGS. 1-2. Depending on the particular embodiment, the computing system 300 may be embodied as a mobile computing device, server, desktop computer, laptop computer, tablet computer, notebook, netbook, Ultrabook™, cellular phone, smartphone, wearable computing device, onboard vehicle computing system, personal digital assistant, Internet of Things (IoT) device, control panel, router, gateway, and/or any other computing, processing, and/or communication device capable of performing the functions described herein.

The computing system 300 includes a processing device 302 that executes algorithms and/or processes data in accordance with operating logic 308, an input/output device 304 that enables communication between the computing system 300 and one or more external devices 310, and memory 306 which stores, for example, data received from the external device 310 via the input/output device 304.

The input/output device 304 allows the computing system 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, Ultra-Wide Band, etc.) to effect such communication depending on the particular computing device 300. The input/output device 304 may include hardware, software, and/or firmware suitable for performing the techniques described herein.

The external device 310 may be any type of device that allows data to be inputted or outputted from the computing system 300. For example, in various embodiments, the external device 310 may be embodied as the emergency responder server 102, the emergency responder mobile device 104, the access control system 106, the access control device 108, the emergency responder 202, the emergency responder vehicle 204, the access control system 206, and/or the access control system 208. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing system 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is of a programmable variety that executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable variety, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing system 300 may form a portion of a system-on-a-chip (SoC) and be incorporated on a single integrated circuit chip.

In some embodiments, various components of the computing system 300 (e.g., the processing device 302 and the memory 306) may be communicatively coupled via an input/output subsystem, which may be embodied as circuitry and/or components to facilitate input/output operations with the processing device 302, the memory 306, and other components of the computing system 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing system 300 may include other or additional components, such as those commonly found in a typical computing device (e.g., various input/output devices and/or other components), in other embodiments. It should be further appreciated that one or more of the components of the computing system 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing system 300 may include multiple processing devices 302, I/O devices 304, and/or memories 306 in other embodiments. Further, in some embodiments, more than one external device 310 may be in communication with the computing system 300.

Figure 4:
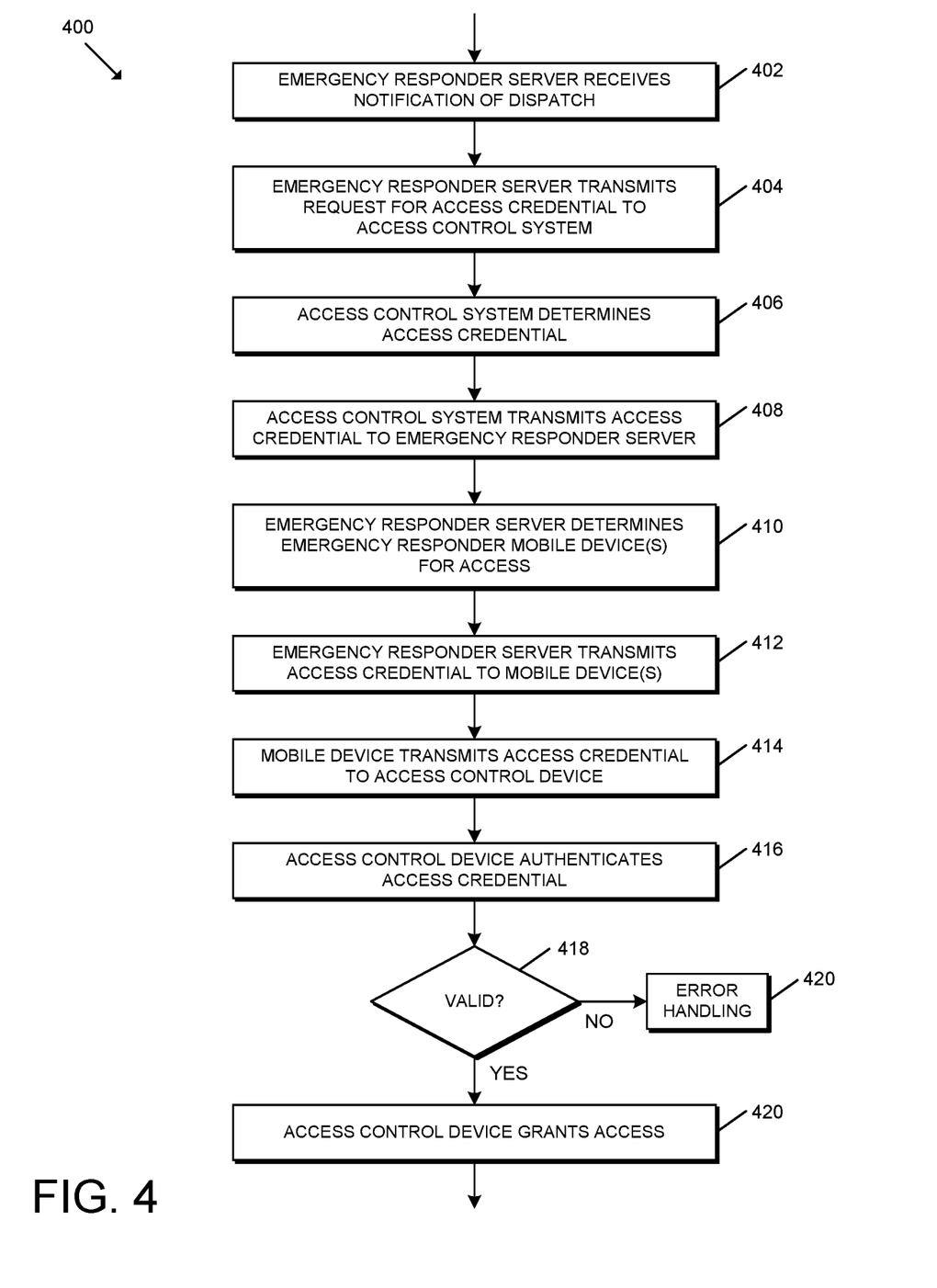
FIG. 4 is a simplified flow diagram of at least one embodiment of a method for providing access control to emergency responders.

Referring now to FIG. 4, in use, the system 100 may execute a method 400 for providing access control to emergency responders. It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 402 in which the emergency responder server 102 receives a notification of emergency dispatch. For example, there may be a 911 call (or other emergency indication) from a certain building, which results in a notification being transmitted to or generated by the emergency responder server 102. In some embodiments, the notification may include one or more identifiers of the location to which emergency responders are being dispatched (e.g., the building name, location address, door/entrance number/identifier, or other identifier of the access control device to which access is desired/required). In some embodiments, it should be appreciated that access to a particular emergency location may require access through multiple access control devices 108 (e.g., doors, gates, etc.), and in such embodiments, the notification (and subsequently issued access credential(s)) may be associated with all of those access control devices 108. However, the access control device 108 is described in the singular for simplicity of the description.

In block 404, the emergency responder server 102 transmits a request for an access credential to the access control system 106. In some embodiments, the request may include the notification and/or one or more identifiers of the location for which access is being requested. As described above, in some embodiments, the emergency responder server 102 may transmit the request via a network-to-network or cloud-to-cloud interface between the emergency responder network 110 and the access control network 112.

In block 406, the access control system 106 determines the access credential associated with the request. In other words, the access control system 106 may retrieve, generate, and/or otherwise retrieve an access credential for gaining access to one or more access control devices 108 at the emergency location/building. In some embodiments, the access control system 106 may identify and/or generate the access credential based on the one or more identifiers of the location for which access in being requested and/or the relevant access control devices 108 in particular. For example, the access control system 106 may compare the identifiers to an access control database in some embodiments.

In block 408, the access control system 106 transmits the access credential to the emergency responder server 102 (e.g., via the network-to-network or cloud-to-cloud interface between the emergency responder network 110 and the access control network 112). In block 410, the emergency responder server 102 determines one or more emergency responder mobile devices 104 to receive the access credential in order to gain access through the passageway(s) secured by the relevant access control device(s) 108. For example, in some embodiments, the emergency responder server 102 may identify the mobile devices 104 associated with the emergency responders who have indicated that they are responding to the emergency situation and/or identify the emergency responders that will be instructed to do so. In block 412, the emergency responder server 102 transmits the access credential to those emergency responder mobile devices 104.

In block 414, upon arrival at the emergency location/building, the emergency responder mobile device 104 transmits the access credential to the relevant access control device 108 in order to gain access through the passageway secured by the access control device 108. In the illustrative embodiment, the emergency responder mobile device 104 is configured to wirelessly communicate the access credential to the access control device 108 when the emergency responder mobile device 104 is within a threshold distance (e.g., within a geofence) of the access control device 108. For example, the emergency responder mobile device 104 may be configured to automatically establish a Bluetooth (e.g., BLE), Near Field Communication (NFC), Ultra-Wide Band (UWB), and/or other type of wireless communication connection with the access control device 108 for securely exchanging the access credential. It should be appreciated that, in some embodiment, the access credential may be transmitted automatically without user interaction with the emergency responder mobile device 104 to allow the emergency responder to retain two free hands for safe entry into the building. In other embodiments, the user may otherwise interact with the emergency responder mobile device 104 in order to convey a user intent to enter the building and thereby cause transmittal of the access credential to the access control device 108. In some embodiments, the relevant access control device 108 may generate an audible or visual alert such that the emergency responder may quickly identify the correct access control device 108 through which to gain entry.

In block 416, the access control device 108 authenticates the access credential to determine whether the emergency responder is authorized to access the passageway secured by the access control device 108. If the access control device 108 determines, in block 418, that the access credential is valid/authorized, the access control device 108 grants access in block 420. Otherwise, in block 420, the access control device 108 and/or the access control system 106 in general performs one or more error handling functions. For example, in some embodiments, the access control device 108 may attempt to revalidate the access credential, generate an alert message/notification, and/or otherwise remediate the error.

Although the blocks 402-420 are described in a relatively serial manner, it should be appreciated that various blocks of the method 400 may be performed in parallel in some embodiments.

Figure 5:
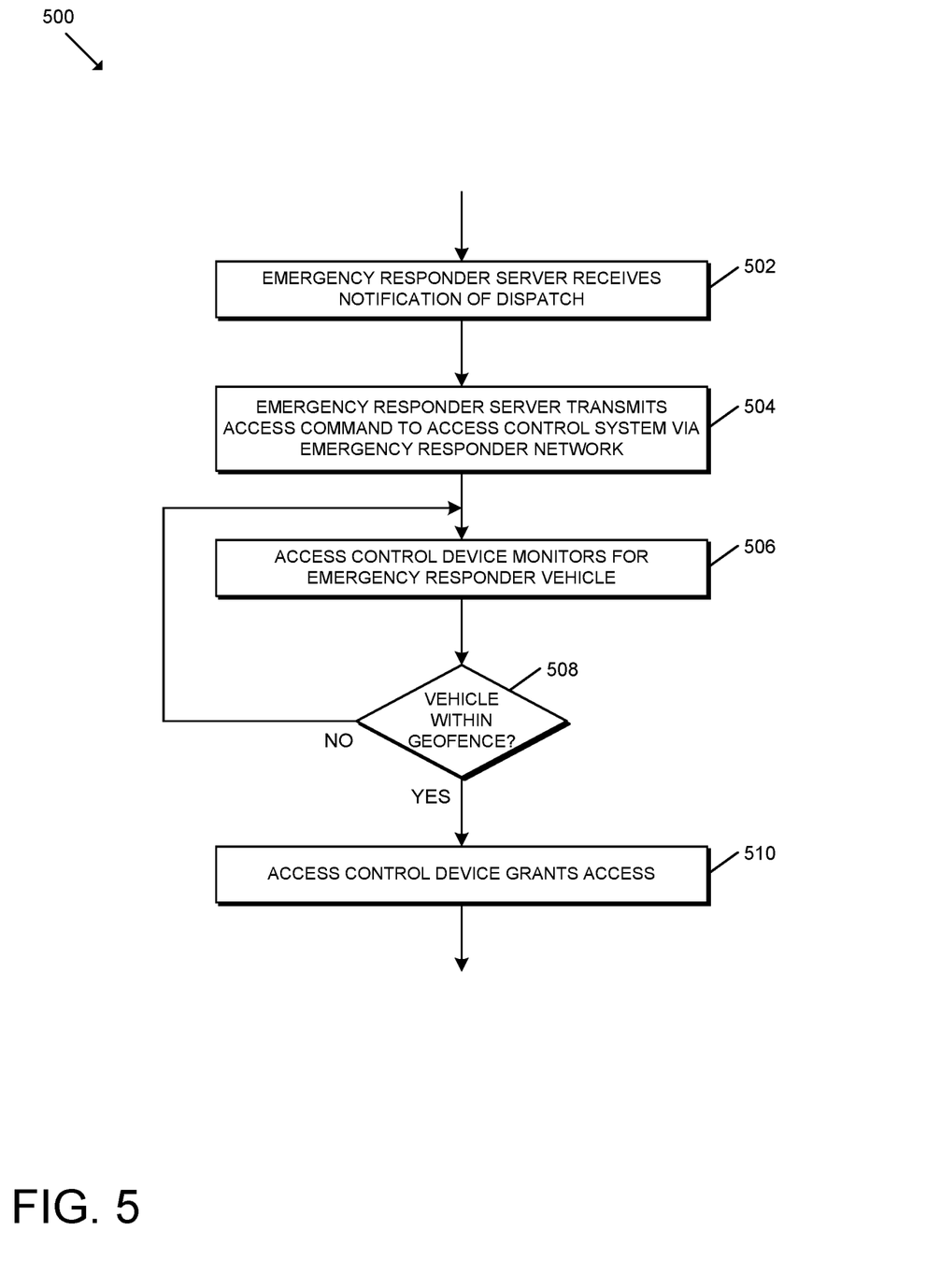
FIG. 5 is a simplified flow diagram of at least one other embodiment of a method for providing access control to emergency responders.

Referring now to FIG. 5, in use, the system 200 may execute a method 500 for providing access control to emergency responders. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 500 begins with block 502 in which the emergency responder server 202 receives a notification of emergency dispatch. For example, there may be a 911 call (or other emergency indication) from a certain building, which results in a notification being transmitted to or generated by the emergency responder server 202. In some embodiments, the notification may include one or more identifiers of the location to which emergency responders are being dispatched (e.g., the building name, location address, door/entrance number/identifier, or other identifier of the access control device to which access is desired/required). In some embodiments, it should be appreciated that access to a particular emergency location may require access through multiple access control devices 208 (e.g., doors, gates, etc.), and in such embodiments, the notification (and subsequently issued access credential(s)) may be associated with all of those access control devices 208. However, the access control device 208 is described in the singular for simplicity of the description.

In block 504, the emergency responder server 202 transmits an access command to the access control system 206 (or the access control device 208 in particular) via the emergency responder network 210. As indicated above, in the illustrative embodiment, the emergency responder network 210 may be embodied as a dedicated emergency response network. In particular, the emergency responder network 210 may include existing emergency response infrastructure for priority control systems and traffic management that is integrated with one or more building access control systems 206. It should be appreciated that the access command may serve as an indication to the access control system 206 that an emergency event has occurred.

In block 506, the access control device 208 (or the access control system 206 generally) monitors for the emergency responder vehicle 204 (e.g., based on the GPS coordinates of the vehicle 204). If the access control device 208 determines (or is notified), in block 508, that the emergency responder vehicle 204 is within a threshold distance of the access control device 208 or within a geofence of the access control device 208, the method 500 advances to block 510 in which the access control device 208 grants access through the corresponding passageway. In other words, in some embodiments, two criteria for the emergency responder to gain access include that the emergency responder vehicle 104 is at the location/site and an emergency event has occurred.

Although the blocks 502-510 are described in a relatively serial manner, it should be appreciated that various blocks of the method 500 may be performed in parallel in some embodiments.

In other embodiments, it should be appreciated that the emergency responder server 102, 202 may transmit an unlock command to the access control system 106, 206 in order to cause the access control device 108, 208 to grant access. For example, an emergency responder may rely on such an embodiment if the responder has no access to her mobile device 104 and/or the vehicle 204 is not within the geofence to gain access.

In some embodiments, the emergency responders may leave a "beacon" for later use. For example, as a firefighter works through a burning building, she may leave beacons to indicate which areas of the building have been cleared, which indicates the path taken by the firefighter and also indicates what areas do not require further inspection. Additionally, the beacon could be used to triangulate the position of the firefighter using the access control devices 108, 208 should it be necessary to pinpoint the location of the firefighter within the building (e.g., for subsequent rescue).

What is claimed is:

1. A method of access control for emergency responders, the method comprising:
   receiving, by an emergency responder server, a notification of emergency dispatch indicating that an emergency responder has been dispatched to a location;
   transmitting, by the emergency responder server, a request for an access credential to an access control server that is in communication with multiple access control devices in response to receiving the notification of the emergency dispatch;
   transmitting, by the access control server, the access credential to the emergency responder server over a first network in response to receiving the request from the emergency responder server;
   transmitting, by the emergency responder server, the access credential to an emergency responder mobile device over a second network different from the first network, wherein the second network includes a dedicated emergency responder network; and
   automatically transmitting the access credential from the emergency responder mobile device to the access control devices at the location within a threshold distance of the emergency responder mobile device over a wireless Bluetooth communication connection between the emergency responder mobile device and the access control devices without interaction with the emergency responder mobile device by the emergency responder.

2. The method of claim 1, wherein the notification of the emergency dispatch includes at least one identifier of the access control devices.

3. The method of claim 1, further comprising:
   authenticating, by the access control devices within the threshold distance, the access credential received from the emergency responder mobile device; and
   granting, by the access control devices within the threshold distance, a user of the emergency responder mobile device access to a passageway secured by each of the access control devices within the threshold distance in response to successful authentication of the access credential.

4. The method of claim 1, further comprising transmitting, by the emergency responder server, the access credential to a plurality of emergency responder mobile devices including the emergency responder mobile device.

5. The method of claim 1, wherein at least one of the access control devices comprises a Knox box that includes a mechanical key for access to a passageway; and
   wherein the access credential comprises an access credential to gain access to the Knox box.

6. The method of claim 1, further comprising generating at least one of an audible alert or a visual alert with the access control devices within the threshold distance to identify the access control devices to the emergency responder.

7. The method of claim 1, wherein transmitting the access credential by the access control server to the emergency responder server comprises transmitting the access credential via a cloud-to-cloud interface.

8. The method of claim 1, wherein the notification comprises an identifier of the location to which the emergency responder has been dispatched.

9. A system, comprising:
   an access control system comprising a first processor and a first memory comprising a first plurality of instructions, wherein the access control system includes multiple access control devices in communication with the first processor;
   an emergency responder server comprising a second processor and a second memory comprising a second plurality of instructions; and
   an emergency responder mobile device comprising a third processor and a third memory comprising a third plurality of instructions;
   wherein the second plurality of instructions causes the emergency responder server to, in response to the emergency responder server receiving a notification of emergency dispatch indicating that an emergency responder has been dispatched to a location, transmit a request to the access control system for an access credential in response to receipt of the notification of the emergency dispatch;
   wherein the first plurality of instructions causes the access control system to transmit the access credential to the emergency responder server over a first network in response to receipt of the request from the emergency responder server;
   wherein the second plurality of instructions further causes the emergency responder server to transmit the access credential to the emergency responder mobile device over a second network different from the first network, wherein the second network includes a dedicated emergency responder network; and
   wherein, after receipt of the access credential from the emergency responder server, the third plurality of instructions causes the emergency responder mobile device to automatically transmit the access credential to the access control system devices that are within a threshold distance of the emergency responder device over a wireless Bluetooth communication connection between the emergency responder mobile device and the access control devices without interaction with the emergency responder mobile device by the emergency responder.

10. The system of claim 9, wherein the notification of the emergency dispatch includes at least one identifier of the access control system.

11. The system of claim 9, wherein the first plurality of instructions causes the access control system to:
   authenticate the access credential received from the emergency responder mobile device; and
   grant a user of the emergency responder mobile device access to a passageway secured by each of the access control devices that are within the threshold distance in response to successful authentication of the access credential.

12. The system of claim 9, wherein the second plurality of instructions further causes the emergency responder server to transmit the access credential to a plurality of emergency responder mobile devices including the emergency responder mobile device.

13. The system of claim 9, wherein to transmit the access credential by the access control server to the emergency responder server comprises to transmit the access credential via a cloud-to-cloud interface.

* * * * *